United States Patent
Fechner et al.

(10) Patent No.: US 7,390,761 B2
(45) Date of Patent: Jun. 24, 2008

(54) ALKALINE-EARTH ALUMINOSILICATE GLASS AND USE THEREOF

(75) Inventors: Joery Hinrich Fechner, Mainz (DE); Peter Brix, Mainz (DE); Franz Ott, Mitterteich (DE)

(73) Assignee: Schott AG, Mainz (DE)

( * ) Notice: Subject to any disclaimer, the term of this patent is extended or adjusted under 35 U.S.C. 154(b) by 549 days.

(21) Appl. No.: 10/503,294

(22) PCT Filed: Jan. 29, 2003

(86) PCT No.: PCT/EP03/00883

§ 371 (c)(1),
(2), (4) Date: Aug. 2, 2004

(87) PCT Pub. No.: WO03/064339

PCT Pub. Date: Aug. 7, 2003

(65) Prior Publication Data

US 2005/0085370 A1    Apr. 21, 2005

(30) Foreign Application Priority Data

Feb. 1, 2002  (DE)  .............................. 102 04 150

(51) Int. Cl.
*C03C 3/095*  (2006.01)
*C03C 3/091*  (2006.01)
*C03C 3/087*  (2006.01)

(52) U.S. Cl. .............................. 501/64; 501/66; 501/67; 501/70; 313/636

(58) Field of Classification Search .................. 501/64, 501/66, 67, 70; 313/636
See application file for complete search history.

(56) References Cited

U.S. PATENT DOCUMENTS

| | | | |
|---|---|---|---|
| 3,531,677 A | 9/1970 | Loughridge | |
| 4,820,326 A | 4/1989 | Speit | |
| 5,196,759 A | 3/1993 | Parham et al. | |
| 5,464,462 A | 11/1995 | Langer et al. | |
| 5,569,979 A | 10/1996 | Scott et al. | |
| 5,599,753 A | 2/1997 | Watzke et al. | |
| 6,069,100 A | 5/2000 | Naumann et al. | |
| 6,074,969 A | 6/2000 | Naumann et al. | |
| 6,096,670 A | 8/2000 | Lautenschlager et al. | |
| 6,373,193 B1 | 4/2002 | Marlor et al. | |
| 6,671,026 B2 | 12/2003 | Peuchert et al. | |
| 6,680,266 B1 | 1/2004 | Peuchert et al. | |
| 6,831,026 B2 * | 12/2004 | Ovuthitham ................. | 501/11 |
| 6,858,522 B1 | 2/2005 | Burton et al. | |
| 6,858,552 B2 | 2/2005 | Peuchert | |
| 6,989,633 B2 * | 1/2006 | Kunert et al. ............... | 313/636 |
| 7,211,957 B2 * | 5/2007 | Bergmann et al. .......... | 313/636 |
| 2006/0068982 A1 * | 3/2006 | Fechner et al. ............... | 501/70 |

FOREIGN PATENT DOCUMENTS

| | | |
|---|---|---|
| DE | 36 43 421 A1 | 6/1988 |
| DE | 195 05 617 C2 | 10/1995 |
| DE | 197 39 912 C1 | 12/1998 |
| DE | 197 47 354 C1 | 12/1998 |
| DE | 197 47 355 C1 | 6/1999 |
| DE | 197 58 481 C1 | 6/1999 |
| DE | 19747355 | 6/1999 |
| DE | 19758481 | 6/1999 |
| DE | 198 51 927 C2 | 5/2000 |
| DE | 19851927 | 5/2000 |
| DE | 100 00 839 C1 | 5/2001 |
| DE | 199 42 259 C1 | 5/2001 |
| DE | 100 06 305 C2 | 8/2001 |
| DE | 10006305 | 8/2001 |
| DE | 100 64 804 C2 | 7/2002 |
| EP | 0 558 270 A1 | 9/1993 |
| EP | 0 574 158 A1 | 12/1993 |
| EP | 0 588 284 B1 | 3/1994 |
| EP | 0 699 636 B1 | 3/1996 |
| EP | 0 913 365 B1 | 5/1999 |
| EP | 1 219 573 B1 | 7/2002 |
| JP | 56-32347 * | 4/1981 |
| WO | WO 99/14794 | 3/1999 |
| WO | WO 0185632 | 11/2001 |

OTHER PUBLICATIONS

Horst Scholze, Glas—Natur, Struktur und Eigenschaften (Nature, Structure and Properties), Zweite, neubearbeitete Auflage (Second Revised Edition) Springer-Verlag Berlin Heidelberg New York 1977, p. 188.
Werkstoffkunde Der Hochvakuumtechnik, Dr. Werner Espe—Materials Science Of High Vacuum Technology by Dr. Werner Espe, Professor at the Bratislava Technical University, vol. II, Silicate materials, Veb Deutscher Verlag Der Wissenschaften Berlin 1960, pp. 1-20 with English translation.
Technik der Glasherstellung, Prof. Dr. rer. nat. Gunther Nolle, Mit 127 Bildern und 34 Tabellen, Veb Deutscher Verlag fur Grundstoffindustrie Leipzig Nov. 18, 1997 pp. 1, 2, 3, 33.
English translation of DE 197 47 355 C1—"Glass which can withstand high temperatures for lamp bulbs, and its use".

* cited by examiner

*Primary Examiner*—Karl E Group
(74) *Attorney, Agent, or Firm*—Millen, White, Zelano & Branigan, P.C.

(57) ABSTRACT

The invention relates to an alkaline-earth aluminosilicate glass with the following composition (in wt. %, based on oxide content): $SiO_2$ >58-62; $B_2O_3$ 0 5.5; $Al_2O_3$ 13.5 17.5; MgO 0-7; CaO 5.5-14; SrO 0-8; BaO 6-14; $ZrO_2$ 0-2; $CeO_2$ 0.001 0.5; $TiO_2$ 0.01-2. The glass is particularly suitable for use as a bulb material for halogen light bulbs.

20 Claims, 4 Drawing Sheets

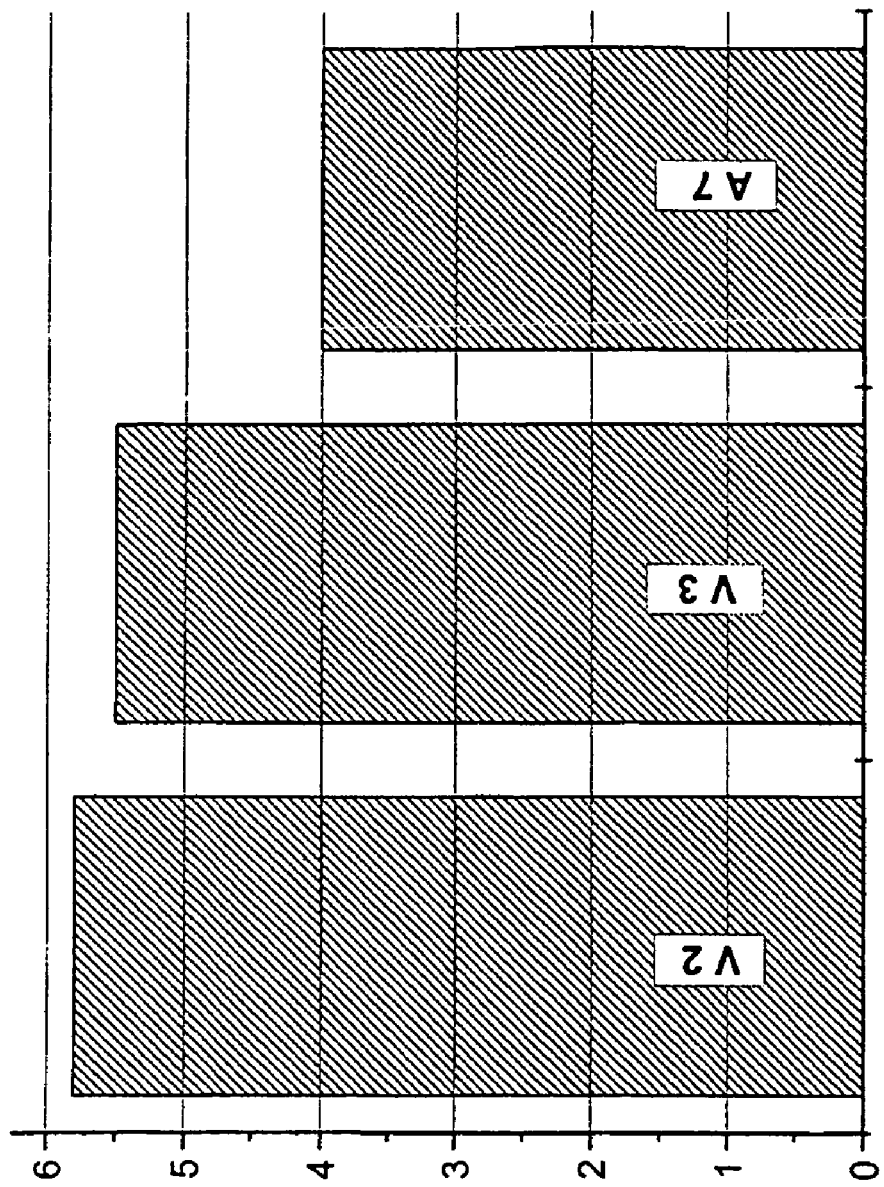

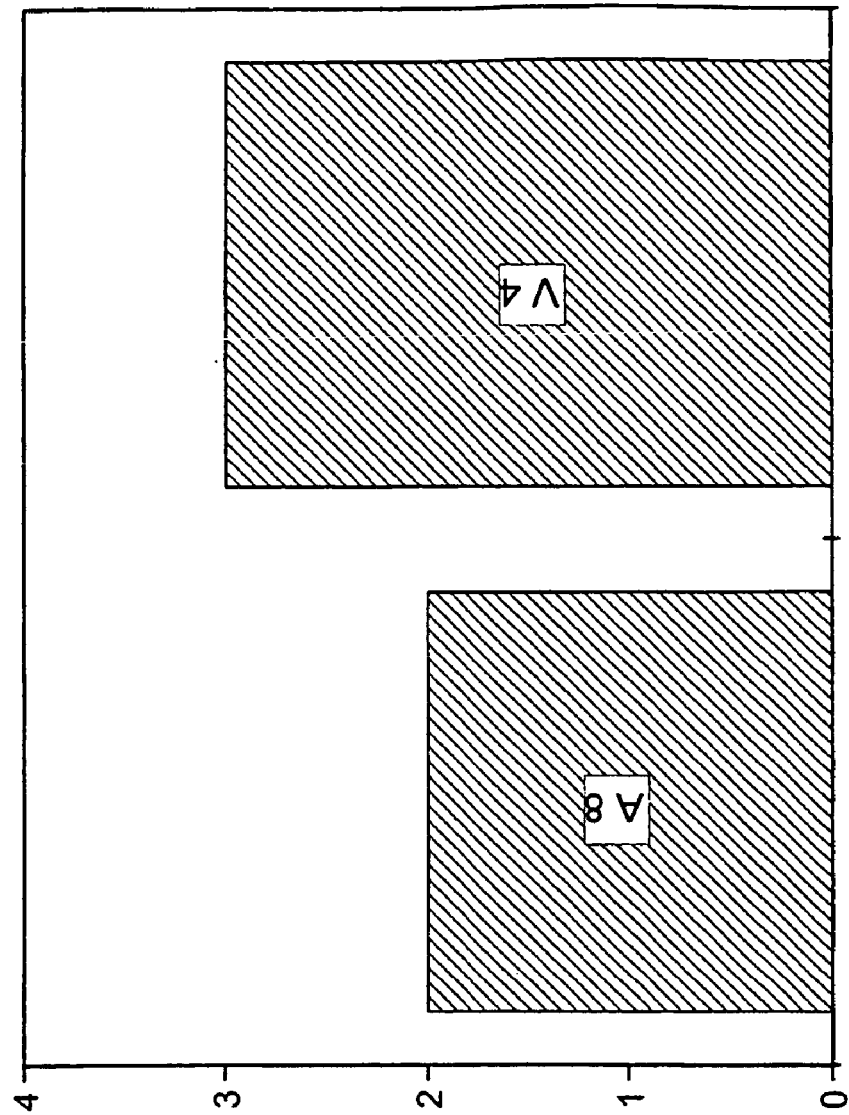

ALKALINE-EARTH ALUMINOSILICATE GLASS AND USE THEREOF

Figure 1:
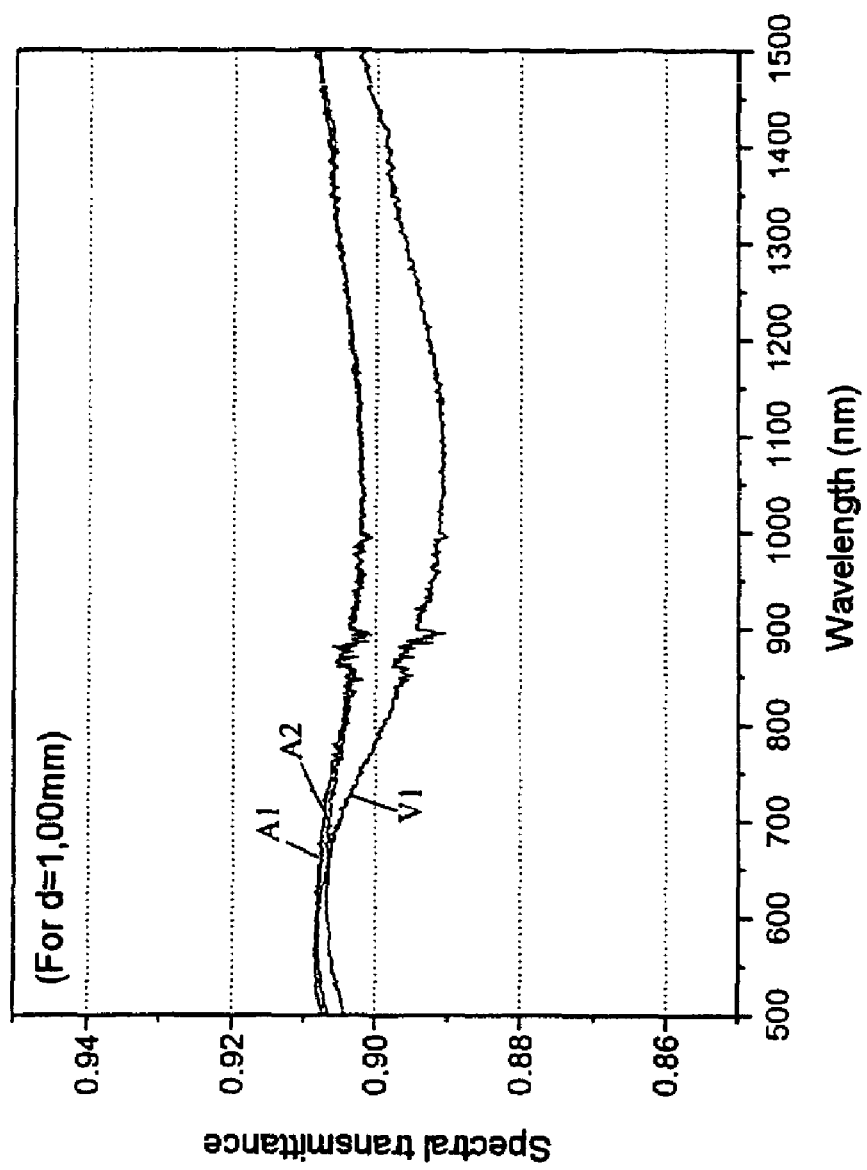

The invention relates to an alkaline-earth aluminosilicate glass, which is suitable in particular as a halogen lamp glass, and to its use.

Certain demands are imposed on halogen lamp glasses not only with regard to their ability to withstand thermal loads, expressed by their transformation temperature Tg (a Tg of $\geq 700°$ C. is required for bulb temperatures of $\geq 650°$ C.), and their ability to be fused to the electrode and supply conductor material, expressed by a thermal expansion matched to the material, i.e. an equal or similar coefficient of thermal expansion (for example, an $\alpha_{20/300}$ of between $4.3 \times 10^{-6}$/K and $4.95 \times 10^{-6}$/K is required for matching to molybdenum components), but also with regard to their transmission characteristics.

For example, the visible wavelength region (VIS) requires the maximum possible light transmission, in order to obtain a high light yield from the lamp. A high transmission is also desirable in the infrared region (IR), since this allows more thermal radiation to be dissipated and the temperature within the lamp remains lower. Therefore, the ability of the halogen lamp to withstand thermal loads is increased. In the ultraviolet region (UV), the transmission should be as low as possible, and the transition from the opaque UV region (i.e. transmittance<0.01 for a layer thickness of 1 mm) to the transparent VIS region should be as short as possible, i.e. the transmission curve should be as steep as possible in this region. This therefore refers to the UV edge, which is defined at a transmission of 58%. It should be possible to set the UV edge in the wavelength range between 280 and 400 nm.

For a glass as bulb material, the minimum requirements imposed on the transmission in the visible region and also, if a lamp with an improved ability to withstand thermal loads is to be provided, in the infrared region, i.e. in the wavelength range between 500 nm and 1500 nm, are a spectral transmittance of at least 0.9 (for a specimen thickness of 1.0 mm).

A glass must be substantially free of alkali metal oxides if it is to be used as bulb glass for halogen lamp bulbs, since alkali metal ions have an adverse effect on the regenerative halogen cycle of the lamp, with the result that tungsten, rather than being deposited on the filament, is deposited as a disruptive black coating on the inner side of the glass bulb.

A further problem is presented by deposits growing on the incandescent tungsten filament. These have an adverse effect on the service life of the lamp.

A further problem is presented by the formation of white deposits on the inner side of halogen lamps. These are halide deposits formed as a result of halogen from the lamp fill reacting with the glass surface. Deposits of this type reduce the light yield.

Previous glasses used for halogen lamps have various drawbacks, and in particular do not satisfy the high demands imposed on the IR transmission.

Therefore, it is an object of the invention to provide a UV-impermeable glass with adjustable UV edge and with a high transmission in the visible and IR regions, and with a thermal expansion which is matched to the expansion characteristics of molybdenum, which is suitable for use as a bulb material for halogen lamp bulbs.

A particular object of the invention is to discover a glass which, when used as halogen lamp bulb glass, reduces the formation of the abovementioned deposits growing on the filament and forming on the inner side of the bulb.

The objects are achieved by an alkaline-earth aluminosilicate glass in accordance with the main claim.

The glass comprises the base glass system (in % by weight, based on oxide)

| | |
|---|---|
| $SiO_2$ | >58-62 |
| $B_2O_3$ | 0-5.5 |
| $Al_2O_3$ | 13.5-17.5 |
| MgO | 0-7 |
| CaO | 5.5-14 |
| SrO | 0-8 |
| BaO | 6-14 |
| $ZrO_2$ | 0-2 |

Glasses belonging to this or similar base glass systems are already known from DE 197 47 355 C1, DE 197 47 354 C1, DE 197 58 481 C1, WO 99/14794, DE 100 06 305 A1 and DE 100 22 769 A1.

It is essential to the invention for the two components $CeO_2$ and $TiO_2$ to be present in the glass in specific proportions, specifically 0.001 to 0.5% by weight of $CeO_2$ and 0.01 to 2% by weight of $TiO_2$. The simultaneous presence of these two components in said quantities keeps the UV edge in the desired wavelength range between 280 nm and 400 nm, and preferably allows it to be set between 310 nm and 350 nm, minimizing the absorption in the IR region. The simultaneous presence of $CeO_2$ and $TiO_2$ leads to synergistic UV blocking, i.e. the UV-blocking action exceeds the sum of the individual actions. The addition of $CeO_2$ in conjunction with $TiO_2$ increases the solarization stability of the glass. $CeO_2$ also functions as a refining agent.

$CeO_2$ contents higher than those mentioned above would increase the absorption in the visible region, which would lead to brown discoloration. Higher contents of $TiO_2$ would shift the UV edge into the longer-wave, visible region and would thereby lead to yellow discoloration of the glasses.

It is preferable for the $CeO_2$ content to be 0.001-0.2% by weight. A $CeO_2$ content of between 0.01 and 0.2% by weight is preferred, and a $CeO_2$ content of between 0.01 and 0.1% by weight is particularly preferred; furthermore, it is preferable for the $TiO_2$ content to be between 0.01 and 1% by weight, particularly preferably between 0.03 and 0.8% by weight, very particularly preferably between 0.1 and 0.8% by weight.

A glass of the composition range mentioned must be substantially free of alkali metal oxides if it is to be used as bulb glass for halogen lamp bulbs, since alkali metal ions disrupt the regenerative halogen cycle of the lamp. In this context, the term substantially free of alkali metal oxides is to be understood as permitting alkali metal oxide contents of up to 0.1% by weight caused by impurities.

The glass according to the invention is also substantially free of iron oxides, i.e. contains no iron oxides apart from inevitable impurities. Iron oxides would reduce the transmission in the visible region and in particular in the IR region. Iron oxide impurities which have no additional disruptive effect and are inevitable under standard conditions used in glassmaking and using standard raw materials may amount to up to 0.04% by weight, given as $Fe_2O_3$.

Surprisingly, the dopants which include elements with high atomic numbers, namely $CeO_2$ and $TiO_2$, cause no problems with regard to the melting-down of the batch, and do not lead to glass defects, even in the alkali-metal-free glass system used in the present case.

The glass according to the invention has a coefficient of thermal expansion $\alpha_{20/300}$ of between $4.3 \times 10^{-6}$/K and $4.95 \times 10^{-6}$/K, which means that its thermal expansion is well matched to molybdenum, the glass leadthrough material which is customary for halogen lamp bulbs.

The glass according to the invention has a transformation temperature Tg of at least 780° C., and therefore has an ability to withstand thermal loads which is suitable for bulb glasses used for halogen lamps.

The transmission curve of the glass, in particular the spectral transmittance between λ=500 nm and λ=1500 nm of ≧0.9 for a specimen thickness of 1.0 mm, means that the glass according to the invention is also eminently suitable for use as an improved bulb glass for halogen lamps.

In one preferred embodiment, the glass is from the composition range (in % by weight, based on oxide):

| | | |
|---|---|---|
| $SiO_2$ | 59-62 | |
| $B_2O_3$ | 3-5.5 | |
| $Al_2O_3$ | 13.5-15.5 | |
| MgO | 2.5-5 | |
| CaO | 8.2-10.5 | |
| BaO | 8.5-9.5 | |
| $ZrO_2$ | 0-1 | |
| $CeO_2$ | 0.001-0.2 | preferably 0.01-0.1 |
| $TiO_2$ | 0.01-2 | preferably 0.01-1 |

A glass from this composition range is suitable in particular as bulb glass for halogen lamps with bulb temperatures of at most 650° C.

In another preferred embodiment, the glass is from the composition range (in % by weight, based on oxide):

| | | |
|---|---|---|
| $SiO_2$ | >58-62 | |
| $B_2O_3$ | 0-1 | preferably 0.2-0.7 |
| $Al_2O_3$ | 14-17.5 | preferably 15-17.5 |
| MgO | 0-6 | preferably 0-<1 |
| CaO | 5.5-14 | |
| SrO | 0-8 | |
| BaO | 6-14 | preferably 6-10 |
| $ZrO_2$ | 0-1 | preferably 0.05-1 |
| $CeO_2$ | 0.001-0.2 | preferably 0.01-0.1 |
| $TiO_2$ | 0.01-2 | preferably 0.01-1 |

A glass from this composition range is particularly suitable as bulb glass for halogen lamps with bulb temperatures of more than 650° C.

The advantages of the glass according to the invention, in particular its improved transmission properties, are to be clarified on the basis of exemplary embodiments. Standard raw materials were used to produce the example glasses and the comparative glass.

When calculating the batch composition, it was taken into account that $TiO_2$ is also present as an impurity in some raw materials, e.g. in $ZrO_2$.

The well-homogenized batch was melted, refined and homogenized in a laboratory crucible made from quartz glass at 1640° C.

Glasses of the base glass composition (in % by weight, based on oxide) $SiO_2$ 60.85; $Al_2O_3$ 16.5; CaO 13.5; $B_2O_3$ 0.3; $ZrO_2$ 1.0; BaO 7.85 were produced. The glasses also contain:

EXEMPLARY EMBODIMENT 1 (A1)

190 ppm of $CeO_2$, 1100 ppm of $TiO_2$, 320 ppm of $Fe_2O_3$ as an impurity

EXEMPLARY EMBODIMENT 2 (A2)

240 ppm of $CeO_2$, 470 ppm of $TiO_2$, 260 ppm of $Fe_2O_3$ as an impurity

COMPARATIVE EXAMPLE 1 (V1)

<10 ppm of $CeO_2$, 170 ppm of $TiO_2$, 440 ppm of $Fe_2O_3$

EXEMPLARY EMBODIMENT 3 (A3)

580 ppm of $CeO_2$, 150 ppm of $TiO_2$, 220 ppm of $Fe_2O_3$ as an impurity

EXEMPLARY EMBODIMENT 4 (A4)

830 ppm of $CeO_2$, 160 ppm of $TiO_2$, 240 ppm of $Fe_2O_3$ as an impurity

EXEMPLARY EMBODIMENT 5 (A5)

10 ppm of $CeO_2$, 570 ppm of $TiO_2$, 230 ppm of $Fe_2O_3$ as an impurity

EXEMPLARY EMBODIMENT 6 (A6)

10 ppm of $CeO_2$, 850 ppm of $TiO_2$, 160 ppm of $Fe_2O_3$ as an impurity

EXEMPLARY EMBODIMENT 7 (A7)

100 ppm of $CeO_2$, 5000 ppm of $TiO_2$, 290 ppm of $Fe_2O_3$ as an impurity

COMPARATIVE EXAMPLE 2 (V2)

no $CeO_2$, no $TiO_2$, 500 ppm of $Fe_2O_3$

COMPARATIVE EXAMPLE 3 (V3)

no $CeO_2$, no $TiO_2$, 290 ppm of $Fe_2O_3$

EXEMPLARY EMBODIMENT 8 (A8)

10 ppm of $CeO_2$, 5000 ppm of $TiO_2$, 290 ppm of $Fe_2O_3$ as an impurity

COMPARATIVE EXAMPLE 4 (V4)

no $CeO_2$, no $TiO_2$, 290 ppm of $Fe_2O_3$

In all the glasses, the alkali metal content is <300 ppm.

For all the glasses, Tg is 790° C. and $\alpha_{20/300}$ is $4.7 \times 10^{-6}$/K.

FIG. 1 shows the transmission curves (spectral transmittance versus wavelength) for Exemplary Embodiments A1, A2 and Comparative Example V1 (specimen thickness in each case 1.0 mm) in the wavelength range from 500 nm to 1500 nm. FIG. 1 documents the high transmission of the glasses according to the invention with their defined doping with $TiO_2$ and $CeO_2$, in particular compared to the same base glass with the $Fe_2O_3$ doping of the prior art. On account of the increased IR transmission, when the glasses are used as a lamp bulb glass, more heat is dissipated, which ultimately means that a lamp produced using the glass according to the invention has a higher ability to withstand thermal loads.

$\tau_{330}$ (1 mm), i.e. the spectral transmittance at the wavelength λ=330 nm, measured for a specimen thickness of 1 mm, was determined for Exemplary Embodiments A1-A6 and Comparative Example V1. It is 58.9% for A1, 57.6% for A2 and 58.1% for V1, 42.6% for A3, 33.5% for A4, 71.0% for A5 and 69.2% for A6.

For the definition of the UV edge at a transmission of 58%, a $\tau_{330}$ of <58% indicates a UV edge of >330 nm and a $\tau_{330}$ of >58% indicates a UV edge of <330 nm. Therefore, these exemplary embodiments illustrate the variability, i.e. adjustability, of the UV edge within the desired wavelength region.

Figure 2:
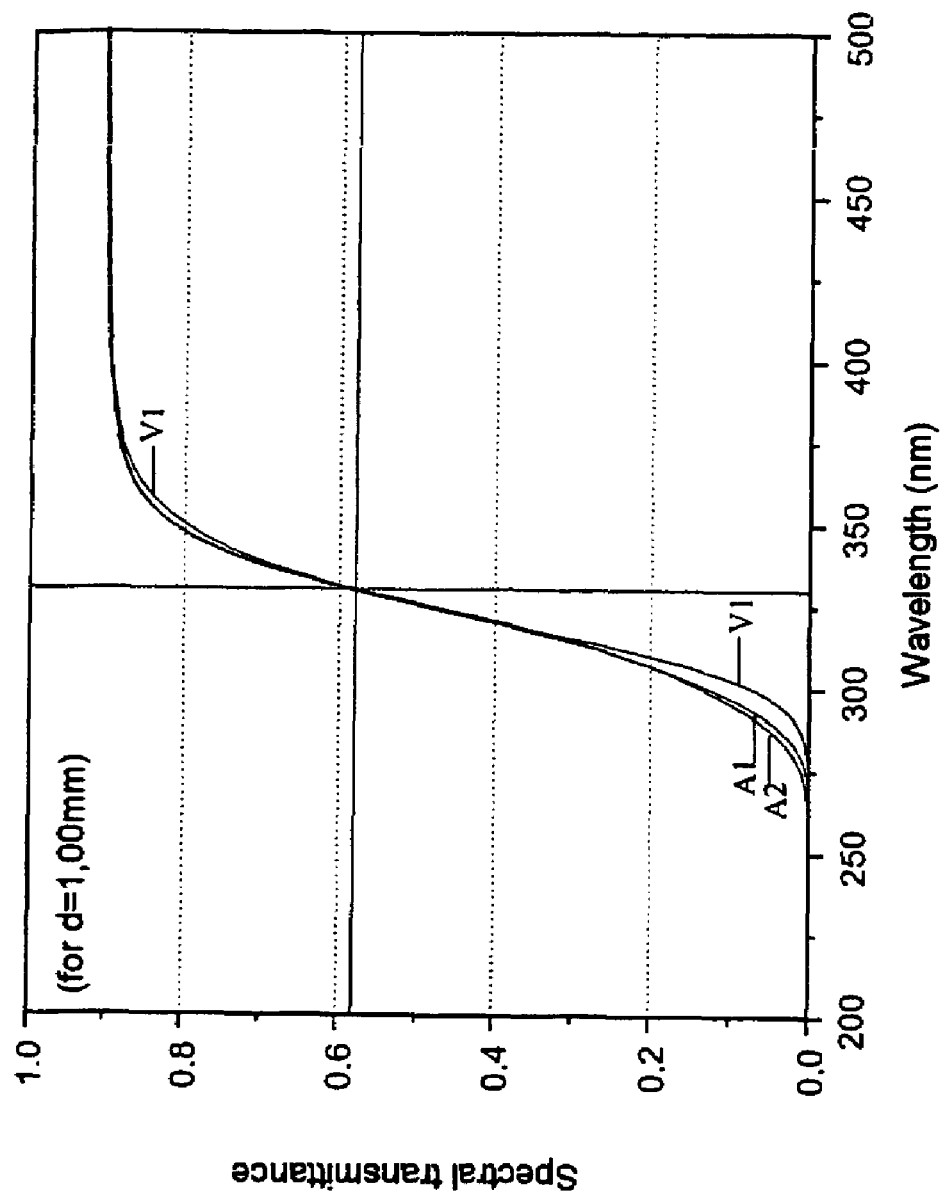

FIG. 2 shows the transmission curves (spectral transmittance versus wavelength for Exemplary Embodiments A1, A2 and Comparative Example V1 (specimen thickness in each case 1.0 mm) for the wavelength range from 200 nm to 500 nm.

At 330 nm, these glasses have a transmittance of approx. 58%, which is where their UV edge is located.

FIG. 2 documents the high UV absorption (transmission <0.01%) and the steepness of the UV edge. FIG. 2 documents that the same UV edge position can be set in the glasses which have been doped in accordance with the invention as in the $Fe_2O_3$-doped glass of the prior art.

Therefore, the glass according to the invention, with its $CeO_2$ and $TiO_2$ doping, makes it possible, as shown in FIG. 2, to dispense with the $Fe_2O_3$ doping, so that the advantage of the high IR transmission revealed in FIG. 1 is achieved without any drawbacks.

FIG. 3 presents an analysis of the pathological growth of deposits on the wound tungsten filament for lamps with bulbs made from glasses from Examples A7 and V2 and V3. The tests were carried out on lamp type H7 under application conditions in a headlight. The burning time was approx. 1000 h.

The analysis was carried out on the basis of a visual assessment system from 1 (=very good=no deposits) to 6 (=extremely poor=such extensive deposits that the filament windings had been short-circuited by them).

The results demonstrate that significantly reduced deposits on the incandescent tungsten filament are observed in the glass according to the invention with its $CeO_2$ and $TiO_2$ doping. This significantly increases the service life of the lamps.

The result for V3 demonstrates that reducing the $Fe_2O_3$ content already slightly reduces the growth of deposits. Further reduction by further reduction in the $Fe_2O_3$ content would have only limited success and would only be possible through the use of extremely low-iron raw materials, which would hugely increase the costs of production of the glasses. The glass according to the invention, therefore, represents a glass which allows the desired improvements to be made with regard to reducing the extent of deposits which are grown on the filament and increasing the service life of the lamp, without placing particular demands on the purity of the raw materials used, i.e. the result is a lamp glass which tolerates greater quantities of $Fe_2O_3$ impurities and is therefore less expensive to produce.

FIG. 4 shows an analysis of the formation of white deposits for the glasses from Examples A8 and V4 in contact with the fill gas used in halogen lamps. The tests were carried out in the following way:

Glass tube sections were fused to form ampules. The ampules were filled with 1000 ppm of $Cl_2BrCH$ and with approx. 2.5 bar xenon. They were then left at 700° C. in a furnace for 92 h.

The analysis was carried out on the basis of a visual assessment system from 1 (=very good=no deposits) to 4 (=poor=extensive deposits).

The results demonstrate that significantly fewer white deposits are observed with the glass according to the invention with its $CeO_2$ and $TiO_2$ doping. As a result, the light yield in lamp operation is improved.

The glass according to the invention therefore represents a glass with an adjustable UV edge, a high transmission in the VIS and IR regions, with a coefficient of thermal expansion matched to the expansion characteristics of molybdenum, which is eminently suitable for use as halogen lamp bulb glass, in particular because halogen lamps with bulbs made from this glass are less susceptible to deposits on the inner side of the bulb and to the growth of deposits on the tungsten filament.

The invention claimed is:

1. An alkaline-earth aluminosilicate glass substantially free of alkali metal oxides and having a composition (in % by weight, based on oxide) of

| | |
|---|---|
| $SiO_2$ | >58-62 |
| $B_2O_3$ | 0-5.5 |
| $Al_2O_3$ | 13.5-17.5 |
| MgO | 0-7 |
| CaO | 5.5-14 |
| SrO | 0-8 |
| BaO | 6-14 |
| $ZrO_2$ | 0-2 |
| $CeO_2$ | 0.001-0.5 |
| $TiO_2$ | 0.01-2 . |

2. The alkaline-earth aluminosilicate glass as claimed in claim 1, having a composition (in % by weight, based on oxide) of

| | |
|---|---|
| $SiO_2$ | 59-62 |
| $B_2O_3$ | 3-5.5 |
| $Al_2O_3$ | 13.5-15.5 |
| MgO | 2.5-5 |
| CaO | 8.2-10.5 |
| BaO | 8.5-9.5 |
| $ZrO_2$ | 0-1 |
| $CeO_2$ | 0.001-0.2 |
| $TiO_2$ | 0.01-2 . |

3. The alkaline-earth aluminosilicate glass as claimed in claim 1, having a composition (in % by weight, based on oxide) of

| | |
|---|---|
| $SiO_2$ | >58-62 |
| $B_2O_3$ | 0-1 |
| $Al_2O_3$ | 14-17.5 |
| MgO | 0-6 |
| CaO | 5.5-14 |
| SrO | 0-8 |
| BaO | 6-14 |
| $ZrO_2$ | 0-1 |
| $CeO_2$ | 0.001-0.2 |
| $TiO_2$ | 0.01-2 . |

4. The alkaline-earth aluminosilicate glass as claimed in claim 1, having a composition (in % by weight, based on oxide) of $SiO_2$ >58-62

| | |
|---|---|
| $SiO_2$ | >58-62 |
| $B_2O_3$ | 0.2-0.7 |
| $Al_2O_3$ | 15-17.5 |
| MgO | 0-<1 |
| CaO | 5.5-14 |
| SrO | 0-8 |
| BaO | 6-10 |
| $ZrO_2$ | 0.05-1 |
| $CeO_2$ | 0.001-0.2 |
| $TiO_2$ | 0.01-2 . |

5. The alkaline-earth aluminosilicate glass as claimed in claim 1, wherein the $CeO_2$ content is between 0.01% by weight and 0.2% by weight.

6. The alkaline-earth aluminosilicate glass as claimed in claim 1, wherein the $TiO_2$ content is between 0.01 and 1% by weight.

7. The alkaline-earth aluminosilicate glass as claimed in claim 1, wherein apart from inevitable impurities it is free of iron oxides.

8. The alkaline-earth aluminosilicate glass as claimed in claim 1, having a spectral transmittance between $\lambda=500$ nm and $\lambda=1500$ nm of >0.9 mm for a specimen thickness of 1.0 mm.

9. The alkaline-earth aluminosilicate glass of claim 5, wherein the $CeO_2$ content is 0.01-0.1% by weight.

10. The alkaline-earth aluminosilicate glass of claim 6, wherein the $TiO_2$ content is 0.03-0.8% by weight.

11. The alkaline-earth aluminosilicate glass of claim 6, wherein the $TiO_2$ content is 0.1-0.8% by weight.

12. The alkaline-earth aluminosilicate glass of claim 9, wherein the $TiO_2$ content is 0.03-0.8% by weight.

13. The alkaline-earth aluminosilicate glass of claim 9, wherein the $TiO_2$ content is 0.1-0.8% by weight.

14. In a halogen lamp comprising a glass bulb, halogen gas, filaments and terminals, the improvement wherein the bulb has a composition according to claim 1.

15. In a method for manufacturing bulbs for halogen lamps, the improvement comprising forming said bulb from a molten composition according to claim 1.

16. In a halogen lamp comprising a glass bulb, halogen gas, filaments and terminals, the improvement wherein the bulb has a composition according to claim 2.

17. In a halogen lamp comprising a glass bulb, halogen gas, filaments and terminals, the improvement wherein the bulb has a composition according to claim 3.

18. In a halogen lamp comprising a glass bulb, halogen gas, filaments and terminals, the improvement wherein the bulb has a composition according to claim 4.

19. In a halogen lamp comprising a glass bulb, halogen gas, filaments and terminals, the improvement wherein the bulb has a composition according to claim 7.

20. In a halogen lamp comprising a glass bulb, halogen gas, filaments and terminals, the improvement wherein the bulb has a composition according to claim 13.

* * * * *

UNITED STATES PATENT AND TRADEMARK OFFICE
CERTIFICATE OF CORRECTION

PATENT NO. : 7,390,761 B2 Page 1 of 1
APPLICATION NO. : 10/503294
DATED : June 24, 2008
INVENTOR(S) : Jorg Hinrich Fechner It is certified that error appears in the above-identified patent and that said Letters Patent is hereby corrected as shown below:

On front page, reads Item (75) "Inventors: Joery" should read --Jorg--

Signed and Sealed this

Second Day of December, 2008

JON W. DUDAS
*Director of the United States Patent and Trademark Office*